United States Patent
Howard-Jenkins et al.

(10) Patent No.: US 12,524,909 B2
(45) Date of Patent: Jan. 13, 2026

(54) PLANE DETECTION AND IDENTIFICATION FOR CITY-SCALE LOCALIZATION

(71) Applicant: Meta Platforms, Inc., Menlo Park, CA (US)

(72) Inventors: Henry Howard-Jenkins, London (GB); Vasileios Balntas, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 520 days.

(21) Appl. No.: 18/051,612

(22) Filed: Nov. 1, 2022

(65) Prior Publication Data
US 2024/0135582 A1 Apr. 25, 2024
US 2024/0233176 A9 Jul. 11, 2024

(51) Int. Cl.
*G06V 10/75* (2022.01)
*G06T 7/73* (2017.01)
(Continued)

(52) U.S. Cl.
CPC .............. *G06T 7/75* (2017.01); *G06V 10/751* (2022.01); *G06V 20/176* (2022.01);
(Continued)

(58) Field of Classification Search
CPC .................. G06T 7/75; G06T 2200/04; G06T 2207/30184; G06T 2207/30196; G06T 2207/30244; G06T 7/73; G06V 10/751; G06V 20/176; G06V 20/647; G06V 10/757
See application file for complete search history.

(56) References Cited

U.S. PATENT DOCUMENTS

| | | | | |
|---|---|---|---|---|
| 2022/0343661 A1* | 10/2022 | Bae | ........................ | G06T 7/0008 |
| 2023/0196618 A1* | 6/2023 | Ivanov | .................... | G06V 20/10 |
| | | | | 382/103 |
| 2023/0351769 A1* | 11/2023 | Wu | ....................... | G06V 10/762 |

OTHER PUBLICATIONS

Liu, L., & Li, J. (2019). A System Framework for Localization and Mapping using High Resolution Cameras of Mobile Devices. In Proceedings of the IEEE/CVF International Conference on Computer Vision Workshops (pp. 0-0). (Year: 2019).*

(Continued)

*Primary Examiner* — Gregory A Morse
*Assistant Examiner* — Renae A Bitor
(74) *Attorney, Agent, or Firm* — Greenberg Traurig, LLP

(57) ABSTRACT

In one embodiment, a method includes accessing an image of one or more target buildings captured by a device; detecting target building planes of the one or more target buildings in the image using a machine learning program; for each of the target building planes: generating a target embedding and target feature points for the target building plane; querying a three-dimensional (3D) map using the target embedding to identify at least one matching building plane for the target building plane; using the target feature points to identify matching feature points of the at least one matching building plane; and determining three-dimensional (3D) locations of the matching feature points using the 3D map; and determining a pose of the device by comparing the target feature points of the target building planes and the 3D locations of the matching feature points associated with the target building planes.

18 Claims, 11 Drawing Sheets
(9 of 11 Drawing Sheet(s) Filed in Color)

(51) Int. Cl.
  *G06V 20/10* (2022.01)
  *G06V 20/64* (2022.01)
(52) U.S. Cl.
  CPC ........ *G06V 20/647* (2022.01); *G06T 2200/04* (2013.01); *G06T 2207/30184* (2013.01); *G06T 2207/30196* (2013.01); *G06T 2207/30244* (2013.01)

(56) References Cited

OTHER PUBLICATIONS

Tarsha-Kurdi, F., Landes, T., & Grussenmeyer, P. (2008). Extended RANSAC algorithm for automatic detection of building roof planes from LiDAR data. The photogrammetric journal of Finland, 21(1), 97-109. (Year: 2008).*
Liu, L., Li, H., & Dai, Y. (2017). Efficient global 2d-3d matching for camera localization in a large-scale 3d map. In Proceedings of the IEEE International Conference on Computer Vision (pp. 2372-2381). (Year: 2017).*
Agarwal S., et al., "Ceres Solver: Tutorial & Reference," 2010, 1 Page, Retrieved from the internet: URL: http://ceres-solver.org/ [retrieved on Mar. 2, 2021].
Baraff D., et al., "Large Steps in Cloth Simulation," In Proceedings of the 25th Annual Conference on Computer Graphics and Interactive Techniques, 1998, pp. 43-54.
Bender J., et al., "A Survey on Position Based Dynamics," Proceedings of the European Association for Computer Graphics: Tutorials, Apr. 2017, vol. 6, pp. 1-31.
Bouaziz S., et al., "Projective Dynamics: Fusing Constraint Projections for Fast Simulation," ACM Transactions on Graphics (TOG), Jul. 2014, vol. 33, No. 4, 11 pages.
Browzwear, "Browzwear Fabric Analyzer," 2022, 1 page, Retrieved from the Internet: URL: https://browzwear.com/products/fabric-analyzer/.
Chen H.Y., et al., "Virtual Elastic Objects," Proceedings of the IEEE/CVF Conference on Computer Vision and Pattern Recognition (CVPR), 2022, pp. 15827-15837.
CLO, "CLO 3D Fashion Design Software," 2022, 6 pages, Retrieved from the Internet: URL: https://www.clo3d.com/.
Clyde D., et al., "Modeling and Data-Driven Parameter Estimation for Woven Fabrics," Proceedings of the ACM SIGGRAPH / Eurographics Symposium on Computer Animation, Jul. 2017, vol. 17, 11 pages, Retrieved from the internet: URL: https://doi.org/10.1145/3099564.3099577.
Du T., et al., "DiffPD: Differentiable Projective Dynamics with Contact," ACM Transactions on Graphics, 2021, vol. 41, No. 2, 25 pages.
Fratarcangeli M., et al., "Vivace: A Practical Gauss-Seidel Method for stable Soft Body Dynamics," ACM Transactions on Graphics (TOG), Nov. 2016, vol. 35, No. 6, pp. 1-9.
Griwodz C., et al., AliceVision Meshroom: An Open-Source 3D Reconstruction Pipeline,: In Proceedings of the 12th ACM Multimedia Systems Conference, Jun. 2021, pp. 241-247, Retrieved from the internet: URL: https://doi.org/10.1145/3458305.3478443.
Hu Y., et al., "ChainQueen: A Real-Time Differentiable Physical Simulator for Soft Robotics," Proceedings of IEEE International Conference on Robotics and Automation (ICRA), May 2019, 13 pages.
Jatavallabhula K.M., et al., "Gradsim: Differentiable Simulation for System Identification and Visuomotor Control," International Conference on Learning Representations (ICLR), 2021, 25 pages, Retrieved from the internet: URL: https://openreview.net/forum?id=c_E8kFWfhp0.
Ju E., et al., "Estimating Cloth Simulation Parameters From a Static Drape Using Neural Networks," IEEE Access, 2020, vol. 8, pp. 195113-195121.
Kiran S.B., et al., "Estimating Cloth Simulation Parameters from Video," In Proceedings of the 2003 ACM SIGGRAPH/ Eurographics Symposium on Computer Animation, 2003, 15 pages.
Li H., et al., "Global Correspondence Optimization for Non-Rigid Registration of Depth Scans," In Computer Graphics Forum, 2008, vol. 27, No. 5, 10 pages.
Liang J., et al., "Differentiable Cloth Simulation for Inverse Problems," Advances in Neural Information Processing Systems (NeurIPS 2019), 2019, vol. 32, 10 pages, Retrieved from the internet: URL: https://proceedings.neurips.cc/paper/2019/file/28f0b864598a1291557bed248a998d4e-Paper.pdf.
Liu T., et al., "Fast Simulation of Mass-Spring Systems," ACM Transactions on Graphics (TOG), Nov. 2013, vol. 32, No. 6, pp. 1-7.
Luible C., "Study of Mechanical Properties in the Simulation of 3D Garments," University of Geneva, 2008, No. SES 678, 263 pages.
Macklin M., et al., "A Constraint-Based Formulation of Stable Neo-Hookean Materials," In Motion, Interaction and Games, Nov. 2021, No. 12, pp. 1-7.
Macklin M., et al., "XPBD: Position-Based Simulation of Compliant Constrained Dynamics," In Proceedings of the 9th International Conference on Motion in Games, Oct. 2016, pp. 49-54, Retrieved from the Internet: URL: http://mmacklin.com/xpbd.pdf.
Miguel E., et al., "Data-Driven Estimation of Cloth Simulation Models," Computer graphics Forum, 2012, vol. 31 (2), pp. 519-528.
Muller M., et al., "Position Based Dynamics," Journal of Visual Communication and Image Representation, Oct. 21, 2014, vol. 18, No. 2, 23 pages.
Optitex, "Optitex Fabric Analyzer," Jun. 28, 2022, 8 pages, Retrieved from the Internet: URL: https://optitex.com/products/fabric-management/.
Overby M., et al., "ADMM ? Projective Dynamics: Fast Simulation of Hyperelastic Models with Dynamic Constraints," IEEE Transactions on Visualization and Computer Graphics, 2017, vol. 23, No. 10, 14 pages.
Qiao Y.L., et al., "Scalable Differentiable Physics for Learning and Control," Proceedings of the 37th International Conference on Machine Learning (ICML), Jul. 13, 2020, 12 pages.
SIDEFX, "Houdini," 2019, 3 pages.
Strecke M., et al., "DiffSDFSim: Differentiable Rigid-Body Dynamics With Implicit Shapes," In International Conference on 3D Vision (3DV), Dec. 2021, 22 pages.
Stuyck T., "Cloth Simulation for Computer Graphics," Synthesis Lectures on Visual Computing: Computer Graphics, Animation, Computational Photography, and Imaging, Aug. 2018, vol. 10, No. 3, 123 pages.
Wang H., et al., "Data-Driven Elastic Models For Cloth: Modeling and measurement," ACM Transactions on Graphics, Proceedings of ACM SIGGRAPH 2011, Vancouver, BC Canada, Jul. 2011, vol. 30 (4), pp. 1-11.
Weiss S., et al., "Correspondence-Free Material Reconstruction using Sparse Surface Constraints," In Conference on Computer Vision and Pattern Recognition (CVPR), Jun. 13-19, 2022, pp. 4686-4695.
Yang S., et al., "Learning-Based Cloth Material Recovery from Video," In Proceedings of the IEEE International Conference on Computer Vision (ICCV), Oct. 22-29, 2017, pp. 4383-4393.

* cited by examiner

PLANE DETECTION AND IDENTIFICATION FOR CITY-SCALE LOCALIZATION

CROSS-REFERENCE TO RELATED APPLICATIONS

This application claims priority to G.R. Patent Application No. 20220100872, filed Oct. 25, 2022, all of which are hereby incorporated by reference herein in their entirety.

TECHNICAL FIELD

This disclosure generally relates to localization techniques, and in particular, related to plane-based localization in urban environments.

BACKGROUND

Camera localization is the task of estimating the location (and orientation) of an image within a known scene in the form of a 6 degree of freedom (DoF) camera pose. Certain methods in camera localization have followed a structure-based paradigm where 2D image points are matched with global 3D points of the known environment. As the scale of the scene increases, matching against all known 3D points in the environment quickly becomes intractable.

SUMMARY OF PARTICULAR EMBODIMENTS

The purpose and advantages of the disclosed subject matter will be set forth in the description that follows. Additional advantages of the disclosed subject matter will be realized and attained by the methods and systems particularly pointed out in the written description and claims, as well as from the appended drawings.

The disclosed subject matter provides systems and techniques for plane-based localization. As the scale of the scene increases, matching against all known 3D points in the environment quickly becomes intractable, motivating a hierarchical approach to localization where parts of the environment are retrieved based on a coarse estimation of a pose before the fine-grained matching between image and specific regions of the model. Image retrieval has formed the basis of the coarse estimate of a pose in such systems.

However, people's perception and intuition of the world are not limited to, or accurately reflected by, point features. Instead, we naturally abstract the world into high-level geometric primitives, such as corners and planes, or semantically, where complicated geometry may be bound together and considered a singular object. As the world's geometry becomes increasingly mapped, the rich structural representations such as 3D CAD models that reflect the perception are becoming more readily available and offer an opportunity as the next step beyond point maps.

Certain instance-based localization methods can leverage these more intuitive abstractions by reformulating localization as an instance-level recognition task. In these methods, a coarse estimation of a pose is treated as a classification task between a known set of classes or abstractions in the environment. Local correspondences between the query image and the known environment are then established via predictions specific to the identified class, such as through the dense regression of local features or coordinate regression, each specific to the identified object. While these methods better follow our perception by identifying distinctive abstractions of the world, however, they do not generalize beyond the region in which they were trained and require the re-learning of instance-specific classes and local correspondences when moving to a new region.

The disclosed subject matter provides an example method comprising accessing an image of one or more target buildings captured by a device; detecting target building planes of the one or more target buildings in the image using a machine learning program; for each of the target building planes: generating a target embedding and target feature points for the target building plane; querying a three-dimensional (3D) map using the target embedding to identify at least one matching building plane for the target building plane; using the target feature points to identify matching feature points of the at least one matching building plane, and determining three-dimensional (3D) locations of the matching feature points using the 3D map, and determining a pose of the device by comparing the target feature points of the target building planes and the 3D locations of the matching feature points associated with the target building planes.

In certain embodiments, the method can further include generating feature points of buildings in a city based on images of the buildings; and generating the 3D map by comparing the feature points to a three-dimensional (3D) model of the city to associate the feature points to building elements of the buildings, wherein each building element comprises a building facet or a building plane.

In certain embodiments, the determining a pose of the device can include taking an inlier point and removing an outlier point using a customized random sample consensus algorithm (RANSAC). In non-limiting embodiments, the RANSAC is configured to (a) randomly select a subset of the target building planes of the one or more target buildings in the image; (b) use the selected subset of the target building planes together to determine the 3D locations of the users; and (c) repeat (a) and (b) the process until identifying the 3D locations of the matching feature points and the outlier point.

In certain embodiments, the features in the 3D map are generated from rectified images. In non-limiting embodiments, the method can further include rectifying at least a portion of the image. In certain embodiments, the image can be rectified to a canonical orientation to decrease a viewpoint variance.

In certain embodiments, the 3D locations of the matching feature points can be identified using less than 1000 feature points per building plane.

In certain embodiments, the disclosed subject matter provides a system comprising one or more processors and one or more computer-readable non-transitory storage media coupled to one or more of the processors and comprising instructions operable when executed by one or more of the processors to cause the system to access an image of one or more target buildings captured by a device; detect target building planes of the one or more target buildings in the image using a machine learning program; for each of the target building planes: generate a target embedding and target feature points for the target building plane; query a three-dimensional (3D) map using the target embedding to identify at least one matching building plane for the target building plane; use the target feature points to identify matching feature points of the at least one matching building plane; and determine three-dimensional (3D) locations of the matching feature points using the 3D map; and determine a pose of the device by comparing the target feature points of the target building planes and the 3D locations of the matching feature points associated with the target building planes.

In certain embodiments, the system can be configured to generate feature points of buildings in a city based on images of the buildings; and generate the 3D map by comparing the feature points to a three-dimensional (3D) model of the city to associate the feature points to building elements of the buildings, wherein each building element comprises a building facet or a building plane.

In certain embodiments, the system can be configured to determine a pose of the device by taking an inlier point and removing an outlier point using a customized random sample consensus algorithm (RANSAC). In non-limiting embodiments, the RANSAC can be configured to (a) randomly select a subset of the target building planes of the one or more target buildings in the image; (b) use the selected subset of the target building planes together to determine the 3D locations of the users; and (c) repeat (a) and (b) the process until identifying the 3D locations of the matching feature points and the outlier point.

In certain embodiments, the features in the 3D map can be generated from rectified images. In non-limiting embodiments, at least a portion of the image can be rectified. In certain embodiments, the image can be rectified to a canonical orientation to decrease a viewpoint variance.

In certain embodiments, the 3D locations of the matching feature points are identified using less than 1000 feature points per building plane.

In certain embodiments, the disclosed subject matter provides one or more computer-readable non-transitory storage media embodying software that is operable when executed to access an image of one or more target buildings captured by a device; detect target building planes of the one or more target buildings in the image using a machine learning program; for each of the target building planes: generate a target embedding and target feature points for the target building plane; query a three-dimensional (3D) map using the target embedding to identify at least one matching building plane for the target building plane; use the target feature points to identify matching feature points of the at least one matching building plane; and determine three-dimensional (3D) locations of the matching feature points using the 3D map; and determine a pose of the device by comparing the target feature points of the target building planes and the 3D locations of the matching feature points associated with the target building planes.

In certain embodiments, the media is configured to generate feature points of buildings in a city based on images of the buildings; and generate the 3D map by comparing the feature points to a three-dimensional (3D) model of the city to associate the feature points to building elements of the buildings, wherein each building element comprises a building facet or a building plane.

In certain embodiments, the media can be configured to take an inlier point and remove an outlier point using a customized random sample consensus algorithm (RANSAC) for comparing the extracted building element of the target building to the feature points in the map, wherein the RANSAC is configured to (a) randomly select a subset of the target building planes of the one or more target buildings in the image; (b) use the selected subset of the target building planes together to determine the 3D locations of the users; and (c) repeat (a) and (b) the process until identifying the 3D locations of the matching feature points and the outlier point.

In certain embodiments, the features in the 3D map can be generated from rectified images, wherein at least a portion of the image is rectified to a canonical orientation to decrease a viewpoint variance, wherein the 3D locations of the matching feature points are identified using less than 1000 feature points per a building plane.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
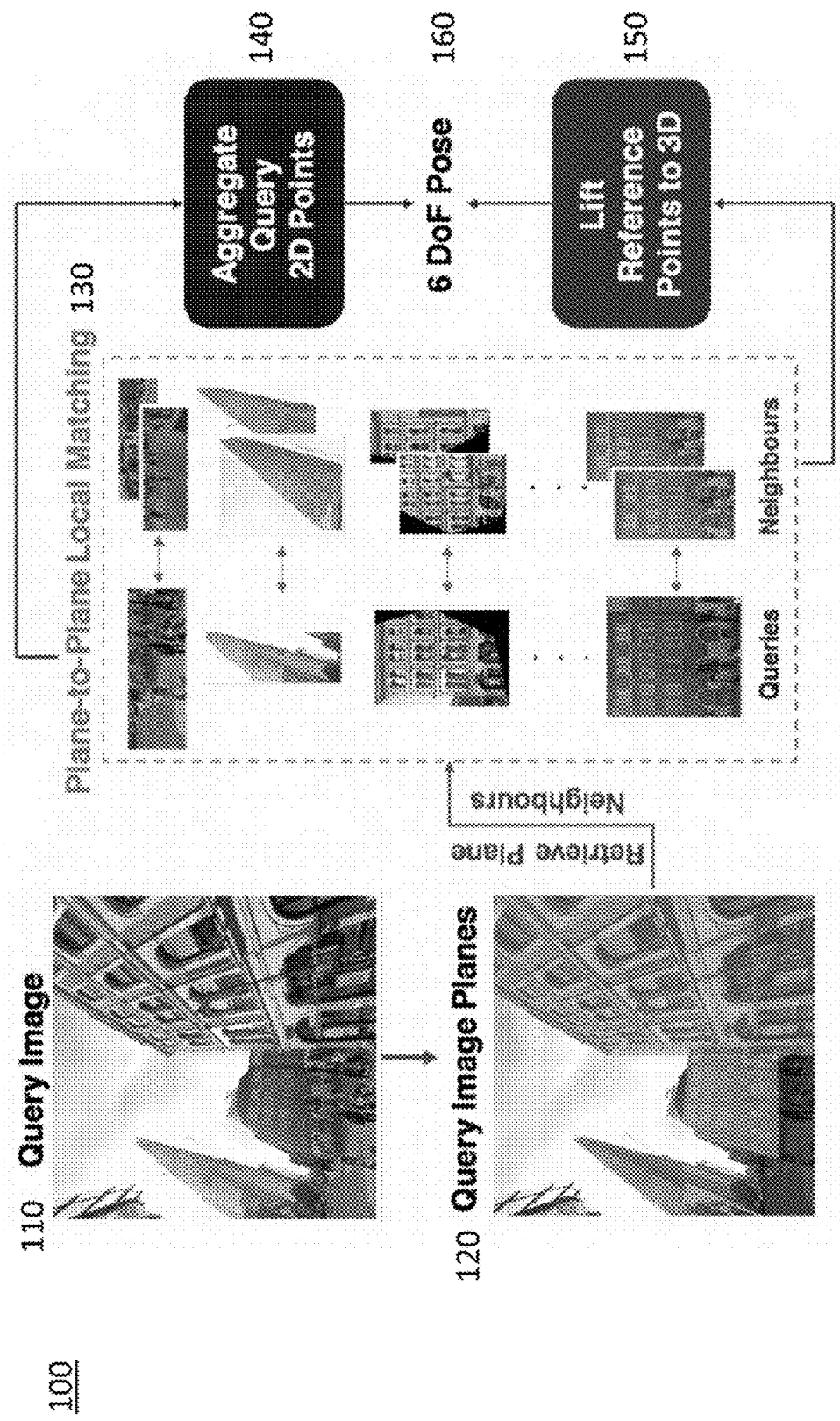
FIG. 1 illustrates an example method for plane-centric hierarchical localization.

The disclosed subject matter provides a plane-centric approach to hierarchical localization (pH-loc) for the urban environment localization. The disclosed systems and methods can leverage structural cues to offer an improvement to large-scale visual localization in urban environments. Rather than using image retrieval as the coarse localization stage in a hierarchical localization strategy, pH-loc operates with visual identification of planar regions of images as an alternative level of granularity. Visual plane description for retrieval can be learned effectively in a self-supervised manner, and geometric coherency of the plane retrievals across a query image can be enforced. In doing so, pH-loc can offer improved localization accuracy and reduced sensitivity to the number of retrievals required to localize in an urban environment when compared to other image-based methods FIG. 1 illustrates a visual overview 100 of an example pH-loc method for plane-centric hierarchical localization. Query images 110 can be divided into planar regions 120. Each of these planar regions 120 can be queried independently to retrieve visually similar planes. Local keypoint detection and matching 130 can be performed for each plane and its respective neighbors. The resulting matches can then be aggregated 140, with the neighbor points lifted to 3D 150, allowing pose prediction 160 through the perspective-n-point (PnP) solving. This formulation can callow the pH-loc to leverage more intuitive abstractions of the world while still maintaining the property of image-based hierarchical localization methods of not needing to retrain for localization in new regions.

Unlike certain instance-level localization techniques that leverage a classification formulation on a fixed number of known classes, each observed multiple times during training, and with shared classes between training and testing, the disclosed pH-loc can extract discriminative descriptors for each plane without learning a specific representation for each. The discriminative descriptors can be used to an open vocabulary of planes, even if they are not seen during training, i.e., without requiring fine-tuning for a new region.

In certain embodiments, the disclosed pH-loc can learn this open plane identification by leveraging a relatively simple formulation of self-supervised contrastive learning. These methods can be trained by generating new views of the same image through augmentation to form positive pairs, with negative pairs taken as views of different images. The distance in representations of positive pairs can be reduced, and the distance between the representation of negative pairs can increase. In non-limiting embodiments, MoCo V2 can be used as the basis of the formulation. In MoCo V2, a task-specific view synthesis design can form an important part of self-supervised contrastive learning methods. The identification of planes can present a natural and convenient strategy for the synthesis of new views: random homographic warping.

In certain embodiments, in an image-based formulation of hierarchical localization, localization can be performed in two stages: a coarse retrieval stage, followed by a local feature matching stage for a fine-grained estimate of a pose. The first image retrieval stage can be performed by building a database of reference images and computing their respective image descriptors with an image embedding network. At inference time, the descriptor of the query image can be computed, and its nearest neighbors from the reference database are retrieved. Local features can be computed in the query image and the neighbor image with keypoint detectors/descriptors, and then correspondences can be found by matching the local keypoints. Key points belonging to the retrieved images are lifted into a 3D, global coordinate frame, often using a structure-from-motion (SfM) model built during the database building stage. In non-limiting embodiments, the disclosed pH-loc can use a pre-built CAD model. This process can provide a set of 2D-to-3D correspondences, which can then be fed into a PnP solver, leading to a prediction of the query image's camera pose.

Figure 2:
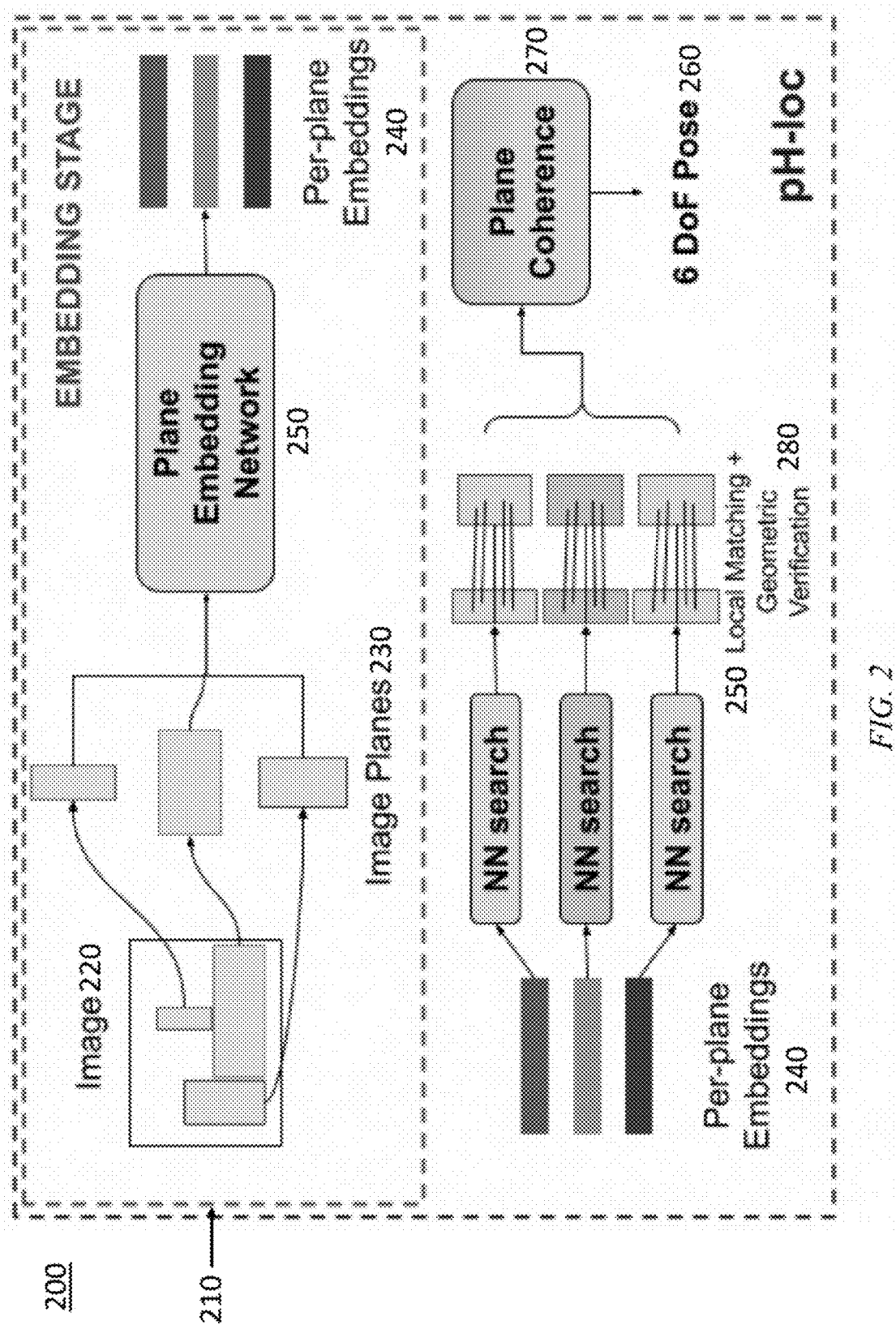
FIG. 2 illustrates an example system for plane-centric hierarchical localization.

FIG. 2 illustrates an overview 200 of the components that form pH-loc and its localization inference pipeline. In the top half 210, the embedding of planes from within an image 220 can be used in the database building phase. In certain embodiments, rather than operating on images as a whole, the disclosed pH-loc can utilize an alternative level of granularity, namely an image's planar regions 230. As such, during database building on the reference set of images, rather than storing a descriptor for the reference image as a whole, each reference image can be divided into its constituent planar regions 230 and store individual embeddings 240 in the plane embedding network 250 for each, as depicted in the top half 210 of FIG. 2. At inference time, for a given query image to localize, it can be divided into its constituent planar regions and embedding. Each embedding 240 can then be queried to find its nearest neighbor planes in the database. For both the query planes and the retrieved planes, the planes can be rectified using their respective normal. Then local features can be computed using a pre-trained keypoint detector and descriptor method.

In certain embodiments, rather than between whole images, local matches 250 can be computed between the planar patches. The matched key points on the retrieved planes can be lifted into 3D using the known geometry from the CAD model to form 2D-to-3D correspondences between the query plane and the retrieved plane. These correspondences across each plane in the query image can then be aggregated to form a single set which is fed into PnP solving for camera pose 260. In non-limiting embodiments, for the local plane-to-plane matching, two forms of geometric verification 260 can be used to filter matches. For example, a homographic constraint can be enforced between the planes, such that all matches need to be consistent with a single homography between query and neighbor. Alternatively, an epipolar constraint between the matches can be enforced in their original image position. The retrieved planes can be geometrically coherent with each other 270.

In certain embodiments, the disclosed pH-loc can provide the retrieved planes that are geometrically coherent with each other 270. For a given query plane, although multiple neighbors, which may each be visually and geometrically plausible, can be retrieved, it may be desirable to select a neighbor for each plane in the query image that is geometrically plausible together. To encourage this, the disclosed pH-loc can provide geometric verification 280 of the ensemble of retrieved planes. For example, the set of plane retrievals used in pose solving can be initialized by taking the neighbors with the most inlier points from the plane-to-plane geometric verification 280. To solve for pose 260 across this ensemble, for each query plane, if its neighbor contributes an inlier to the PnP solution, it is left unchanged. However, for each plane where its selected neighbor contributed no inliers, a new neighbor can be randomly selected (including the current selection). To solve for a pose 260 with this new selection of plane neighbors, this process can be repeated until all query planes' neighbors contribute an inlier to the pose solution, or until a maximum number of iterations is reached, at which point the set of correspondences with the most inliers, and the resulting pose 260, are returned as the prediction.

In certain embodiments, the disclosed pH-loc can perform rectification for vertical planes, which largely comprise the building facades. For example, to rectify a plane, target planes can be rotated such that the normal of the plane points into the camera, and the up direction points upwards on the image plane, which is assumed to be known. To avoid extreme warps, the field-of-view of the rotated image can be limited (e.g., to 140° both vertically and horizontally). In non-limiting embodiments, the region corresponding to the plane that can be the target of the rectification is determined by warping its original segmentation mask using the homography determined by rotation and cropping around the resulting bounding box. If the rectification fails due to the plane not being vertical, the warp being too extreme, or any other reason, the original, unrectified plane can be used. In non-limiting embodiments, the gravity direction can assume to be known as it is an increasingly common piece of image metadata, and, even if not provided by the camera sensor, the up-direction can readily be predicted through line detection or deep-learning-based methods such as NeurVPS, where a median error of less than 0.5°.

In certain embodiments, the disclosed pH-loc can be performed using various data set that includes a plurality of images. For example, the HoliCity dataset, which is a city-scale dataset consisting of over 50,000 perspective images that have been extracted from Street-View panoramas and cover an area of more than 20 $km^2$, can be used. These images can be aligned to a CAD model that spans the entire region, providing rich 3D data. For example, the dataset can be divided such that the region covers a 500 m×500 m area (e.g., which is labeled "HD" within the dataset). The training region can cover the remaining area of the dataset.

In certain embodiments, for plane retrieval, the planes can be fit to 3D models (e.g., CAD model) of the region. Each individual plane in the CAD model can be referred to as an individual class. Observations of these plane classes can be generated through projection into all the images taken within the HD region. Using the semantic labels provided with the dataset, planes from the images, which have been assigned the class "building," can be collected. Observations of the same class are gathered by the ID of the plane class from the CAD model. Any building facade that has not been observed (e.g., a minimum of 6 times) can be removed (e.g., resulting in a total testing set of 759 plane classes and 17,609 observations for the HoliCity dataset). In non-limiting embodiments, the pH-loc can create a split of images taken within the HD region for localization (e.g., such that more than 400 query images and 3702 reference images can be obtained).

In certain embodiments, the performance of the visual plane retrieval can be evaluated. For example, the visual embedding of each plane observation and successively queries each one against the rest of the set of observations can be computed retrieving its 5 nearest neighbors. Five can be chosen to ensure that each class has a minimum of 6 observations in total, and therefore has at least 5 possible positive retrievals. Retrievals can be considered positive when the observations belong to the same plane class and negative when they belong to another class. For each class, Recall@1, Recall@5 and MAP@5 can be computed, and the average of class averages can be reported. In certain embodiments, for localization, the disclosed pH-loc can use the split of reference images for database building and localize each image (e.g., of the 400 query images). Local keypoints in reference images can be lifted into 3D using the CAD model of the region. The median localization errors (e.g., both translation and orientation errors in the units cm/°) can be evaluated and be reported. In non-limiting embodiments, the percentage of query images, which are successfully localized, with successful localization being determined by placing translation and angular error thresholds on the predicted camera pose, can be evaluated and reported.

In certain embodiments, the disclosed pH-loc can include a visual plane retrieval network. For example, pH-loc can include a visual plane retrieval network as a standard ResNet50 architecture. pH-loc can pool the feature map outputted from the final convolutional block with GeM pooling to produce the final 2048-d for each plane. Planes can be resized so that their minimum length can be 256 pixels, and planes that are smaller than 96 pixels can be discarded. In non-limiting embodiments, an MLP projector can be included for training that includes two fully-connected layers separated by a ReLU non-linearity.

In certain embodiments, for our image-based localization baselines, pH-loc can utilize a ResNet50 model with GeM pooling and a learned whitening that has been trained on a data set. The localization performance resulting from these retrieves can outperform results when using a ResNet101 AP-GeM for retrieval.

In certain embodiments, local features detection and description can be performed using D2Net, which leverages a VGG-16 architecture and has been trained on MegaDepth. The detected keypoints can be matched by computing mutual nearest neighbors. In image-based formulations, the maximum number of keypoint detections per image can be up to 5000, whereas in the plane-centric scenario, a maximum of 1000 keypoints per plane can be set.

In certain embodiments, the disclosed self-supervised method of learning generalizable plane identification can outperform ArcFace that forms a natural baseline for comparison due to its strong performance for the instance-level recognition task of face identification. However, ArcFace comes with the drawback that the training images need to be labeled, as opposed to the disclosed method and pH-loc that are able to be trained on an unstructured dataset without the need for an association between frames. In Table 1, results of the disclosed fine-tuning method for visual plane identification are shown. In these results, the disclosed fine-tuning method is able to improve plane retrieval performance over the pre-trained weights in each scenario. In addition, it is able to outperform ArcFace in the task of learning discriminative embeddings.

TABLE 1

Plane retrieval performance after fine-tuning with ArcFace and our proposed self-supervision.

| Pretrained | Training | Recall@1 | Recall@5 | MAP@5 |
|---|---|---|---|---|
| ImageNet | — | 0.611 | 0.703 | 0.353 |
| | ArcFace | 0.690 | 0.763 | 0.447 |
| | Ours | 0.736 | 0.802 | 0.496 |
| GeM GL-18 | — | 0.681 | 0.793 | 0.491 |
| | ArcFace | 0.717 | 0.772 | 0.447 |
| | Ours | 0.728 | 0.800 | 0.486 |

Table 2 lists results when random homographic warps are and are not included in the array of augmentations for view synthesis during our fine-tuning stage. The largest benefit with the inclusion of the random warping is seen, perhaps unsurprisingly, in the non-rectified testing scenario.

TABLE 2

Homography warp in training.

| Warp Aug. | Rectify | Recall@1 | Recall@5 | MAP@5 |
|---|---|---|---|---|
| | | 0.682 | 0.786 | 0.451 |
| ✓ | | 0.728 | 0.800 | 0.486 |
| | ✓ | 0.708 | 0.779 | 0.471 |
| ✓ | ✓ | 0.734 | 0.793 | 0.491 |

All models use the augmentations from MoCo v2, with the only difference being if random homographic warping is included in the view synthesis during training.

In certain embodiments, the disclosed pH-loc can perform various localization methods. For example, the disclosed traditional hierarchical localization strategy, where pose can be solved for each neighbor image with a PnP+RANSAC pose solver, with the predicted pose being selected from the frame with most RANSAC inliers. Certain variants that utilize SuperPoint and SuperGlue for keypoint extraction and matching can be used. In non-limiting embodiments, the disclosed pH-loc can perform the localization using rectified features, where local keypoint matching is still performed between images, but planar regions of the image are rectified, and keypoints are computed on these rectified patches before being aggregated for matching. While plane detection can be bootstrapped through a monocular depth prediction and clustering of normals in only 3 directions for each image, pH-loc can also leverage the plane information so that each image may have an arbitrary number of directions. This is a particularly useful comparison since pH-loc and Rectified Features leverage identical planes and rectification, meaning that performance differences can be attributed to the difference between the image-to-image and our proposed plane-to-plane formulation. In the image-to-image formulations, if localization fails, the pose from the nearest neighbor retrieval is taken as the prediction.

Figure 3B:
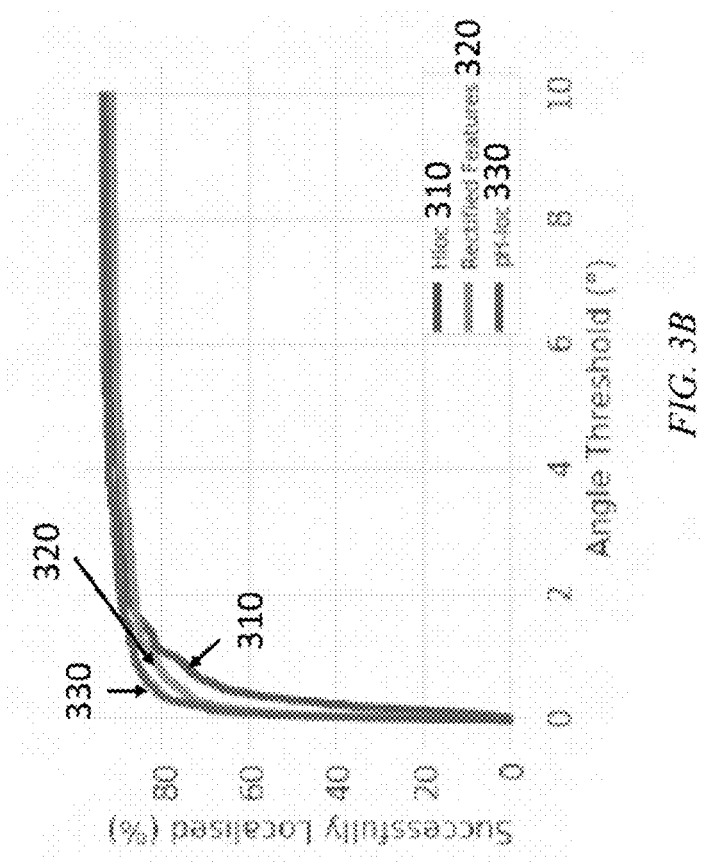
FIGS. 3A and 3B illustrate visualization of the localization accuracy across localization success thresholds.
Figure 3A:
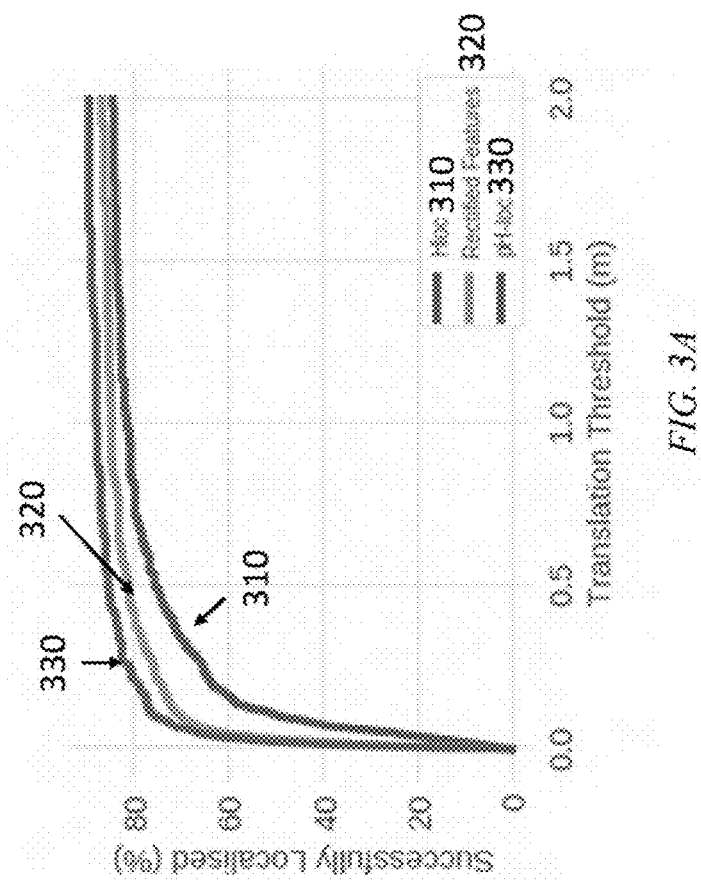
Figure 4:
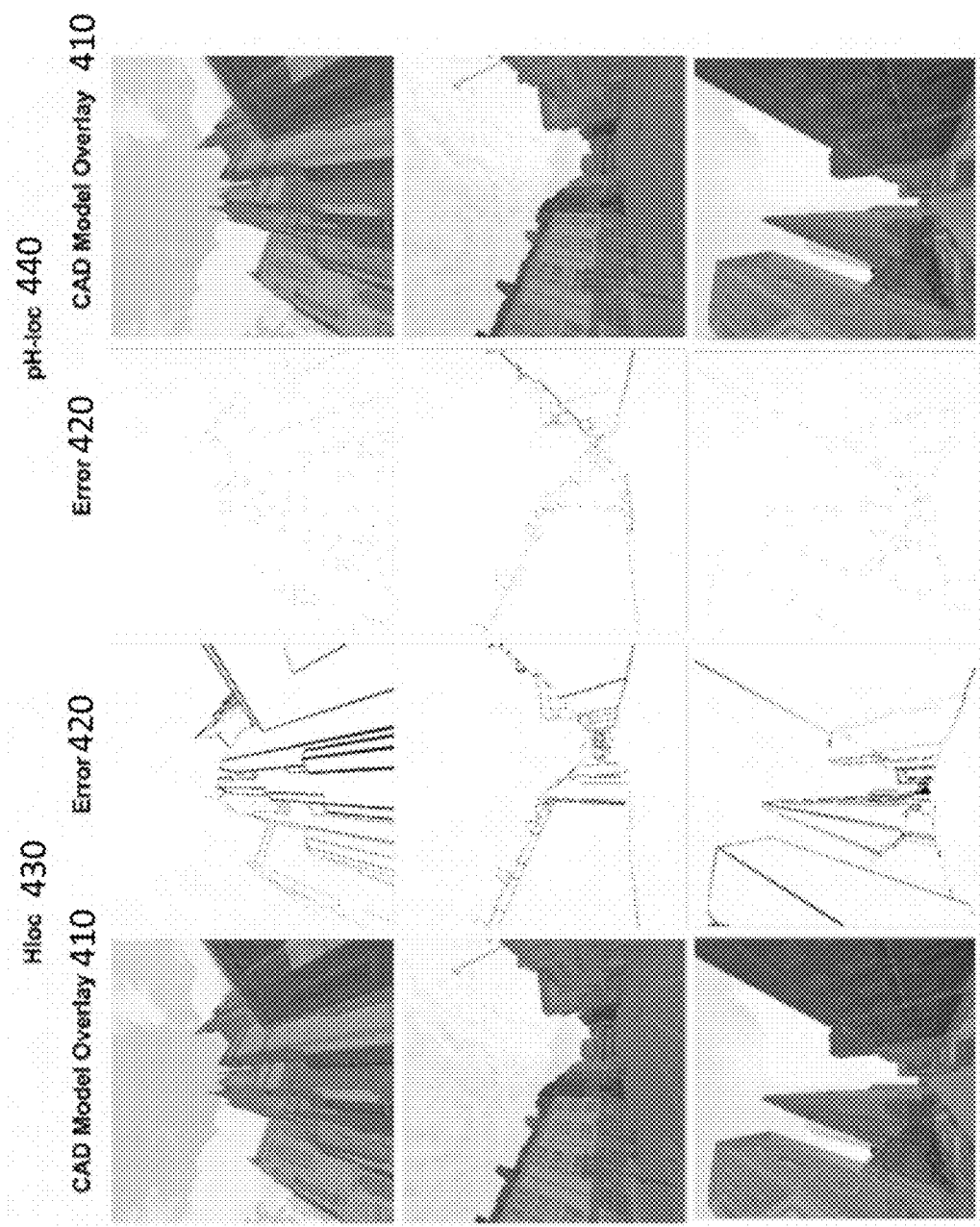
FIG. 4 illustrates an example qualitative visualization of the localization performance.
Figure 5A:
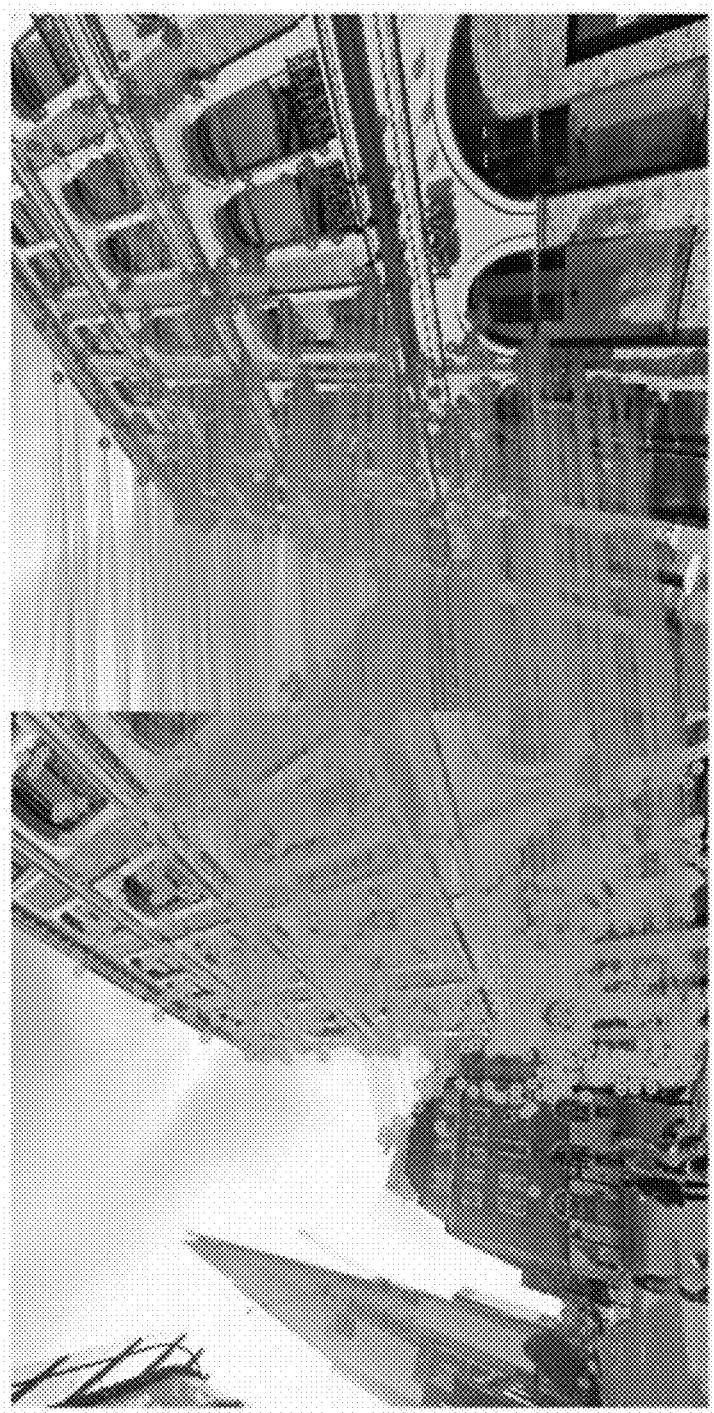
FIGS. 5A and 5B illustrate an example local matching with an image-to-image paradigm as opposed to plane-to-plane.
Figure 5B:
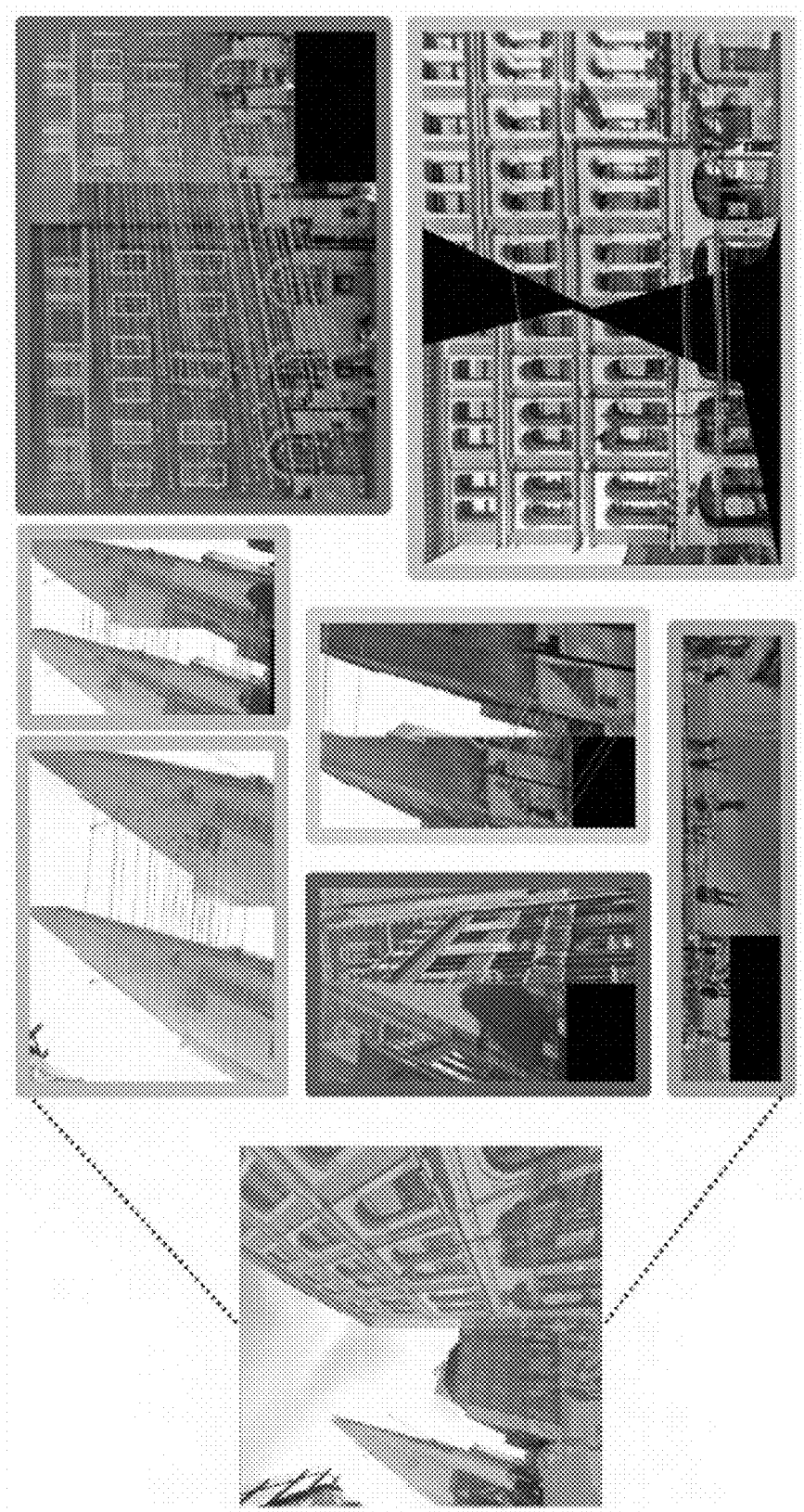

In Table 3 and FIGS. 3A-3B, the localization performance for pH-loc is shown. Results of three methods (Hloc 310, where local features are computed and matched over whole images; Rectified Features 320, where local features are computed on rectified planar regions of the image, before being aggregated and matched over whole images; and pH-loc 330, where local features are computed and matched between retrieved planar regions independently) are compared. When using equivalent keypoint extraction and matching, i.e., D2Net, it can be seen that leveraging planar information in the images leads to significant improvement in localization accuracy. FIG. 4 provides qualitative visualization of localization performance. The CAD model 410 was rendered at the predicted and ground truth. FIG. 4 shows the residual error 420 for both Hloc 430 and pH-loc 440, which demonstrates that pH-loc predictions significantly reduce the rendering error. The accuracy contribution from the disclosed plane-to-plane formulation is given by the difference in performance between Rectified Features and pH-loc, since local keypoints for each planar region are identical and the methods differ only in matching and localization paradigm. These results demonstrate that the disclosed plane-to-plane paradigm improves localization accuracy over the image-to-image formulations tested, which is depicted as a visual example of why this may occur in FIGS. 5A-5B. FIGS. 5A and 5B provide a visual example of local matching with an image-to-image paradigm as opposed to plane-to-plane. Each approach uses 1NN. It can be seen that in the image-based approach (5A), due to a limitation of the retrieval, the local matches only cover the right-hand side of the query image. On the other hand, the planar formulation (5B) encourages matching across the entire image. Notably, pH-loc is able to offer competitive performance in comparison to the SuperPoint and Super-Glue baseline methods. This disparity in keypoint handling is illustrated by the vast difference in performance between the D2Net and Super-Point/SuperGlue implementations.

well as plane coherence, are run with 10NN planes to select from. The coherence provides a significant improvement over the strategies that deal with planes independently.

TABLE 4

Ablation results showing the importance of the disclosed plane coherence for all retrievals from a given query image.

| Selection Method | Median Error (cm/°) | Error < Threshold | | |
|---|---|---|---|---|
| | | 2 cm/0.1° | 10 cm/0.5° | 50 cm/1.0° |
| Visual (i.e. 1NN) | 10.0/0.3 | 21.3% | 48.5% | 62.3% |
| Geometric | 13.6/0.3 | 17.5% | 44.0% | 64.5% |
| Plane Coherence | 2.7/0.1 | 39.0% | 70.0% | 80.0% |

The geometric selection, as well as plane coherence, are run with 10NN planes to select from.

Figure 6B:
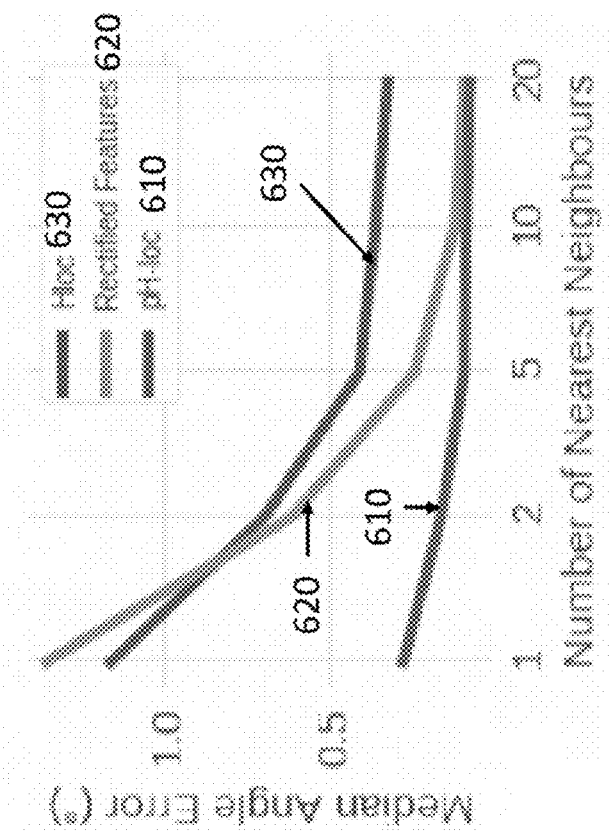
FIGS. 6A-6B illustrate median localization error as the number of retrieval neighbors.
Figure 6A:
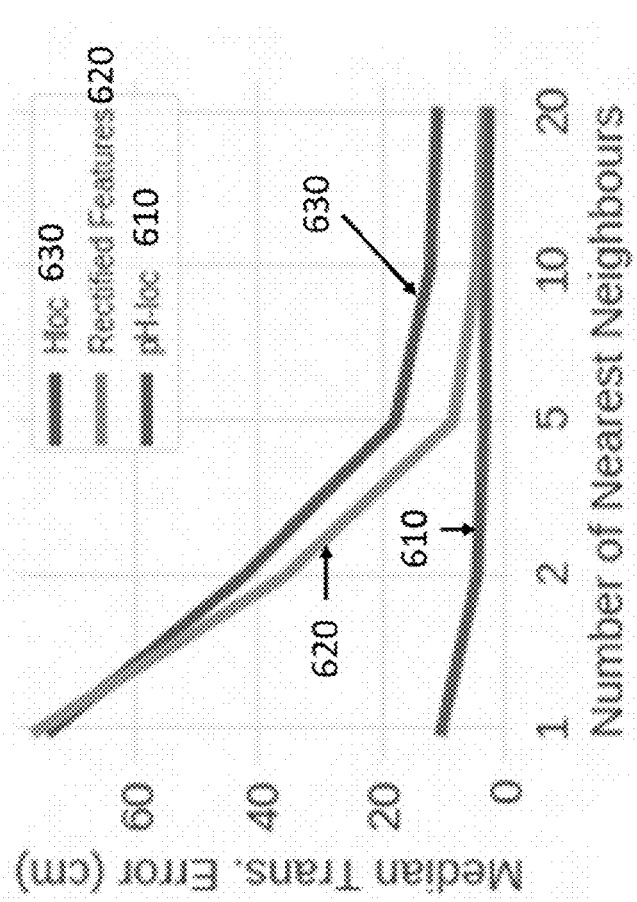

FIGS. 6A-6B show the sensitivity of each localization method to the number of neighbors in the retrieval stage. The plots in FIGS. 6A-6B show the median localization error affected by the number of neighbors retrieved. As shown in FIGS. 6A-6B. pH-loc 610 offers dramatically improved accuracy over the image-based methods (i.e., Rectified features 620 and Hloc 630). The disclosed pH-loc 610 provides increased robustness to retrieving only a few neighbors, likely due to the property that only some of the neighbors need to be correctly retrieved for successful localization. Increased robustness to poor retrievals can mean that local matching requires fewer candidates, significantly reducing the computational burden.

In certain embodiments, the disclosed pH-loc can provide improved localization performance. For example, the disclosed pH-loc can provide improved localization performance when using image retrieval as a prior to thin the pool from which planes can be retrieved. Table 5 shows the localization performance with an image retrieval prior. Results of Table 5 show that where it can be seen that limiting the pool of planes from which pH-loc can retrieve has a significant impact on performance. In each testing

TABLE 3

Localization Performance on the 500 m × 500 m HoliCity HD region.

| Method | Neighbours Type | kNN | Median Error (cm/°) | Error < Threshold (cm/°) | | |
|---|---|---|---|---|---|---|
| | | | | 2 cm/0.1° | 10 cm/0.5° | 50 cm/1.0° |
| Hloc (SP + SG) | Image | 20 | 2.0/0.1 | 47.3% | 64.8% | 74.0% |
| Hloc | Image | 20 | 10.7/0.3 | 3.0% | 45.8% | 70.5% |
| Rectified Features | Image | 20 | 3.1/0.1 | 33.3% | 68.5% | 78.3% |
| pH-loc | Plane | 10 | 2.7/0.1 | 39.0% | 70.0% | 80.0% |
| pH-loc | Plane | 20 | 2.3/0.1 | 41.0% | 74.8% | 84.3% |

Table 4 shows the importance of the disclosed plane coherence for all retrievals from a given query image. Three strategies (visual similarity, where the nearest neighbor for each plane in the query image is selected based on visual descriptor similarity, i.e., the first nearest neighbor from retrieval is always used; geometric, wherefrom the pool of neighbors the plane with the most inliers from a RANSAC homography estimation is selected; and finally our proposed plane coherence algorithm, where the geometric plausibility of the retrievals are considered together across all planes in a query image) are compared. The geometric selection, as configuration, a query image's kNN reference images are retrieved. Then a database of planes is created from only those observed in the retrieved neighbor images. This database of planes is then used as the reference set for pH-loc. In this setting, the reference planes from which neighbors can be retrieved are limited to those present in the k nearest neighbor images. All configurations are 5NN, and planes are not rectified. Results in Table 5 suggest that being able to retrieve planes from a disparate set of views can be important for pH-loc, as opposed to the local matching formulation.

TABLE 5 pH-loc with an image retrieval prior.

| IR Prior | Median Error | Error < Threshold | | |
|---|---|---|---|---|
| k NN | (cm/°) | 2 cm/0.1° | 10 cm/0.5° | 50 cm/1.0° |
| 1 | 107/1.8 | 3.3% | 21.5% | 33.0% |
| 2 | 49.4/0.9 | 5.0% | 30.5% | 46.3% |
| 5 | 22.9/0.5 | 4.3% | 35.8% | 54.8% |
| 20 | 14.9/0.4 | 5.3% | 38.3% | 62.5% |
| 100 | 12.8/0.4 | 2.8% | 41.0% | 66.0% |
| All | 13.5/0.4 | 3.3% | 41.3% | 67.5% | pH-loc's localization performance when using image retrieval can be evaluated prior to thin the pool from which planes can be retrieved.
In this setting, the reference planes, from which neighbors can be retrieved, are limited to those present in the k nearest neighbor images.
All configurations are 5NN, and planes are not rectified.

Figure 7B:
FIGS. 7A-7B illustrate example planes from the CAD model and planes detected by PlaneRCNN.
Figure 7A:
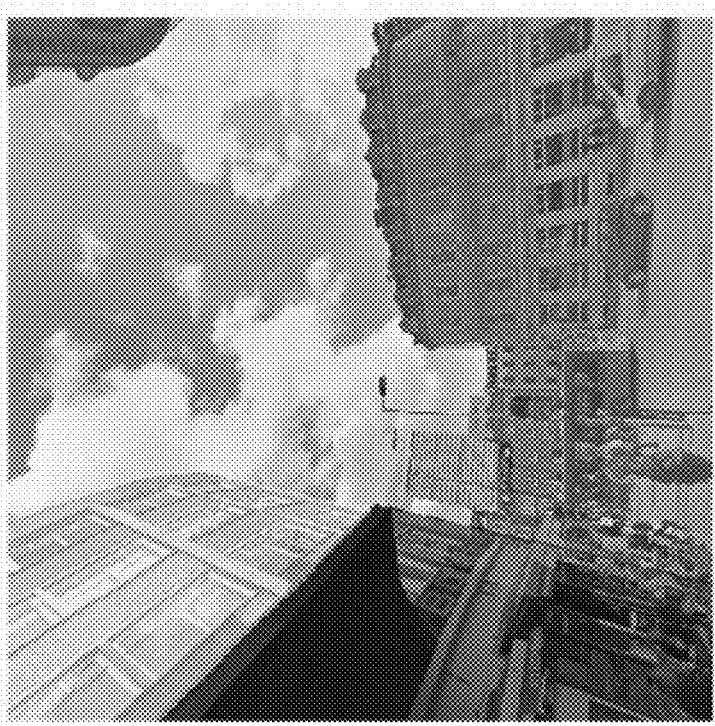

In certain embodiments, the performance improvements offered by pH-loc can extend to real plane detections. For example, PlaneRCNN can be used to detect planes within the images as well as regress their respective plane equations. FIGS. 7A-7B show an example of the detections from the CAD model (FIG. 7A) and PlaneRCNN (FIG. 7B). Then the localization procedure can be performed using the plane predictions from PlaneRCNN. Table 6 provides the localization performance using PlaneRCNN to detect planes and regress their normal for rectification. As it can be seen, pH-loc does drop significantly outperforms an image-to-image baseline, particularly in the tightest localization error threshold.

TABLE 6

Localization performance using PlaneRCNN to detect planes and regress their normal for rectification.

| | Median Error | Error < Threshold | | |
|---|---|---|---|---|
| Method | (cm/°) | 2 cm/0.1° | 10 cm/0.5° | 50 cm/1.0° |
| Hloc | 10.7/0.3 | 3.0% | 45.8% | 70.5% |
| pH-loc | 8.6/0.3 | 17.0% | 50.0% | 66.5% |

Figure 8:
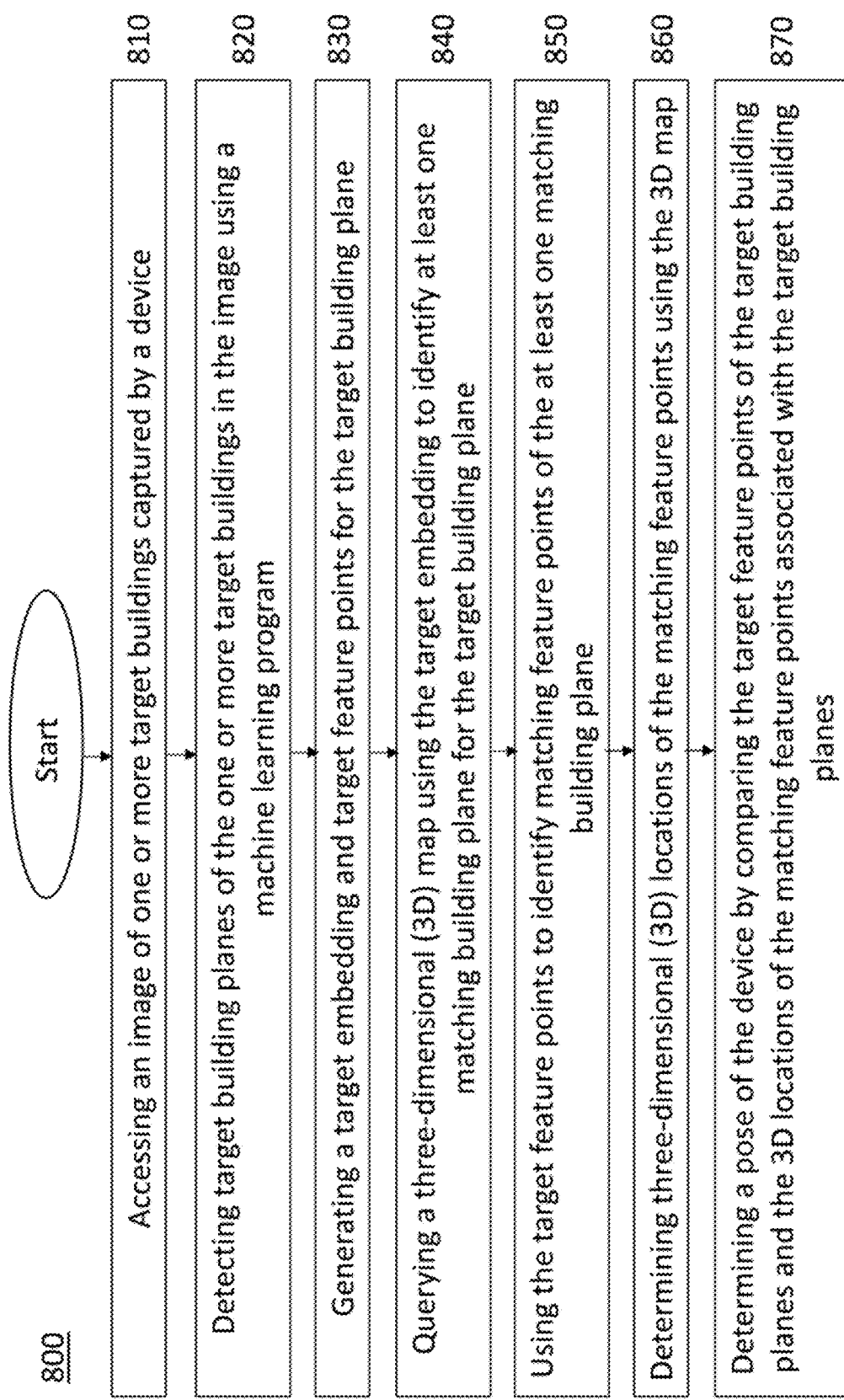
FIG. 8 illustrates an example method for city-scale localization.

FIG. 8 illustrates a flow diagram according to certain embodiments. In particular, FIG. 8 illustrates an example method 800 for plane-based hierarchical localization.

The method may begin at step 810, where a system executing on a computing device can access an image of one or more target buildings captured by a device. For example, a user can capture an image of one or more target buildings using any camera device and store the image in any storage device. The disclosed system can access to the image for the plane-based hierarchical localization of the image.

At step 820, the system can detect target building planes of the one or more target buildings in the image using a machine learning program. For each of the target building planes, at step 830, the system can generate a target embedding and target feature points for the target building plane for each of the target building planes. The embedding can include an embedding with vectors of numbers that can encode the appearance of each of the building planes (i.e., discriminative descriptors for each plane. In non-limiting embodiments, the embedding can be used for finding the matching building plane. For example, instead of using a machine learning model that needs to be trained to learn planes of every building to identify the specific building plane, the disclosed system can use a machine learning model to generate embeddings (e.g., a vector of numbers) that can encode the appearance of each building plane and use it to find similar-looking building planes.

For each of the target building planes, at step 840, the system can query a three-dimensional (3D) map using the target embedding to identify at least one matching building plane for the target building plane. Instead of operating on images as a whole, the disclosed system can operate with visual identification of planar regions of images as an alternative level of granularity. For example, rather than storing a descriptor for the reference image as a whole, each reference image can be divided into its constituent planar regions and store individual embeddings for each. At inference time, for a given query image to localize, the query image can be divided into its constituent planar regions and embedding. Each embedding can be queried to find its nearest neighbor planes in the database. In non-limiting embodiments, the features in the 3D map can be generated from rectified images. For example, all images can be rectified to a canonical orientation to decrease a viewpoint variance. In certain embodiments, at least a portion of an image (e.g., target image) can be rectified.

For each of the target building planes, at step 850, the system can use the target feature points to identify matching feature points of at least one matching building plane. Once matching building planes are found, the disclosed system can find correspondences between the feature points of the matching building planes and the feature points of the target building plane. For example, the local feature point detection and matching are performed for each plane and its respective neighbors. The descriptor of the query image can be computed, and its nearest neighbors from the reference database can be retrieved. Local features can be computed in the query image and the neighbor image with feature point detectors/descriptors. Then correspondences can be identified by matching the local feature points.

At step 860, the system can determine three-dimensional (3D) locations of the matching feature points using the 3D map. For example, the system can lift the matched feature points on the retrieved planes into 3D using the known geometry (e.g., from a CAD model) to form 2D-to-3D correspondences between the query plane and the retrieved plane. In non-limiting embodiments, the 3D locations of the matching feature points can be identified using less than 900 feature points per building plane.

At step 870, the system can determine the pose of the device by comparing the target feature points of the target building planes and the 3D locations of the matching feature points associated with the target building planes. The camera pose is then predicted by solving the perspective-n-point (PnP) problem. For example, the correspondences across each plane in the query image can be aggregated to form a single set, which is fed into PnP solving for camera pose.

In certain embodiments, the system can determine the pose of the device by taking an inlier point and removing an outlier point using a customized random sample consensus algorithm (RANSAC). For example, the RANSAC is configured to (a) randomly select a subset of the target building planes of the one or more target buildings in the image, (b) use the selected subset of the target building planes together to determine the 3D locations of the users, and repeat (a) and (b) the process until identifying the 3D locations of the matching feature points and the outlier point.

Figure 9:
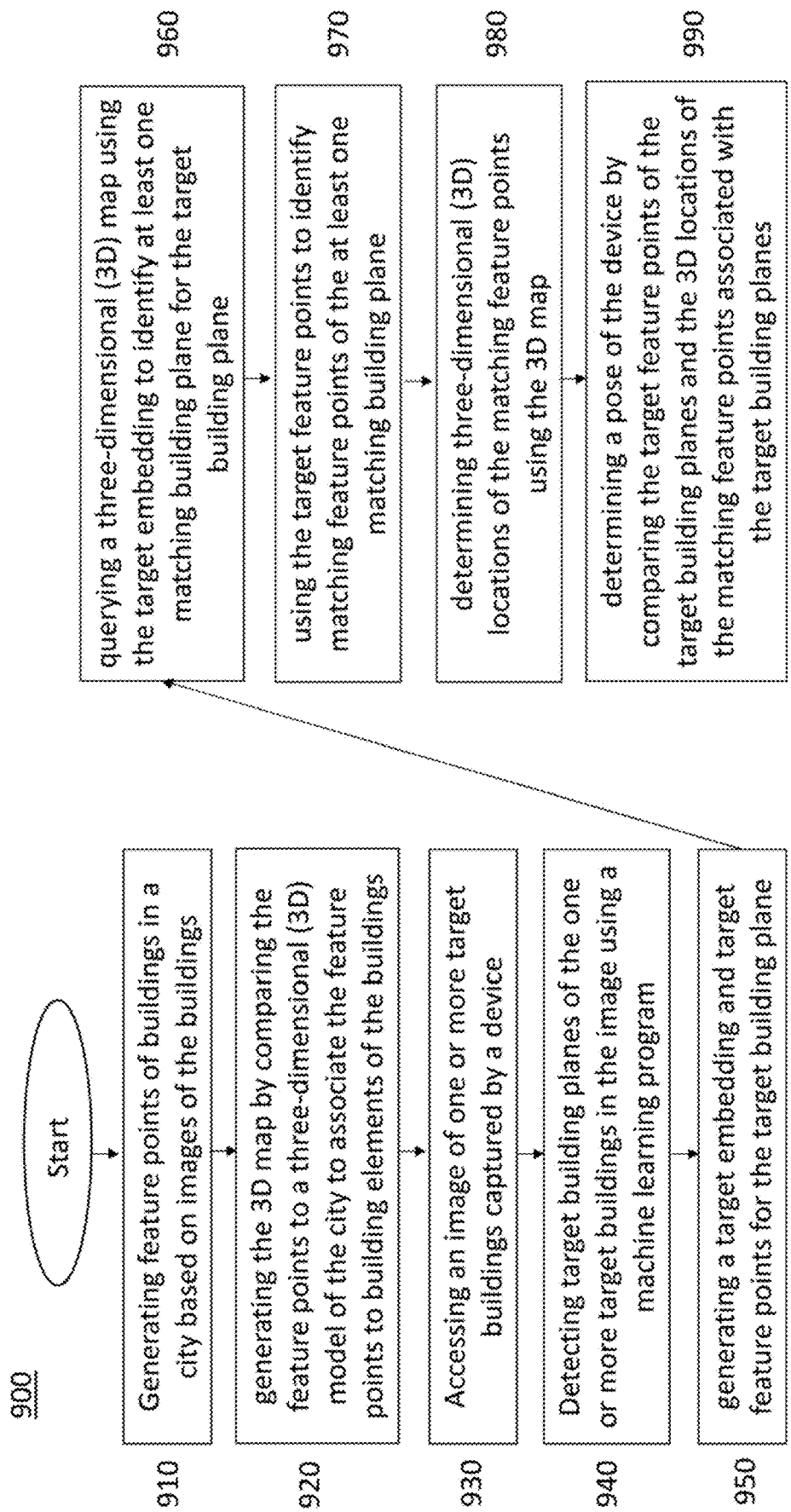
FIG. 9 illustrates an example method for city-scale localization.

The disclosed system can further perform additional steps for plane-based hierarchical localization. FIG. 9 illustrates an example method 900 for transmitting packets. The example illustrated in FIG. 9 can be a continuation of the example illustrated in FIG. 8. As an example and not by way of limitation, a system executing on a computing device can generate feature points of buildings in a city based on images of the buildings at step 910. At step 920, the system can generate the 3D map by comparing the feature points to a three-dimensional (3D) model of the city to associate the feature points to building elements of the buildings. Each building element can include a building facet or a building plane. In non-limiting embodiments, the 3D model can be a 3D CAD model.

The generated 3D map can be used for further steps. For example, at step 930, the system can access an image of one or more target buildings captured by a device. At step 940, the system can detect target building planes of the one or more target buildings in the image using a machine learning program. At step 950, the system can generate a target embedding and target feature points for the target building plane. At step 960, the system can query the 3D map using the target embedding to identify at least one matching building plane for the target building plane.

At step 970, the system can use the target feature points to identify matching feature points of the at least one matching building plane. At step 980, the system can determine the 3D locations of the matching feature points using the 3D map. At step 990, the system can determine the pose of the device by comparing the target feature points of the target building planes and the 3D locations of the matching feature points associated with the target building planes.

Systems and Methods

Figure 10:
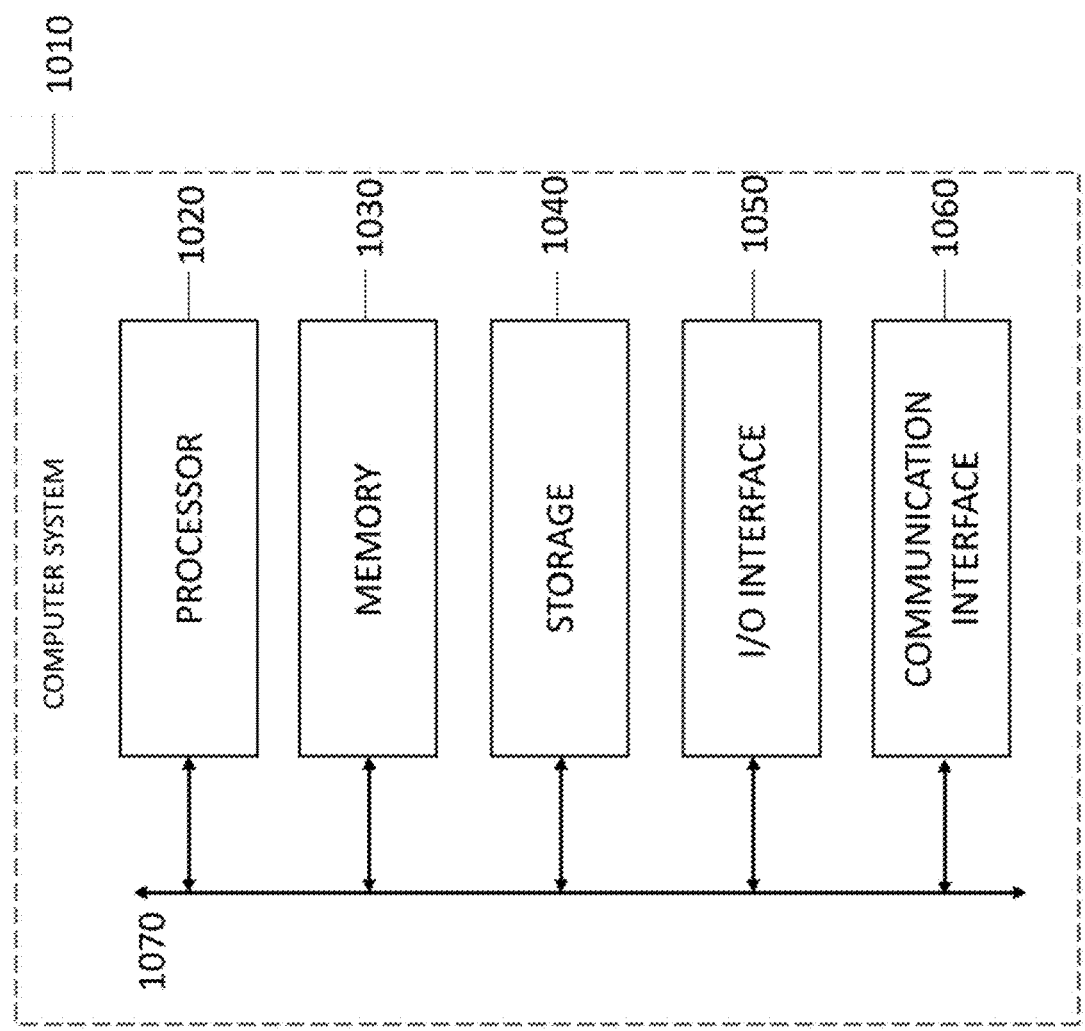
FIG. 10 illustrates an example computer system.

FIG. 10 illustrates an example computer system 1010. In particular embodiments, one or more computer systems 1010 perform one or more steps of one or more methods described or illustrated herein. In particular embodiments, one or more computer systems 1010 provide the functionality described or illustrated herein. In particular embodiments, software running on one or more computer systems 1010 performs one or more steps of one or more methods described or illustrated herein or provides the functionality described or illustrated herein. Particular embodiments include one or more portions of one or more computer systems 1010. Herein, a reference to a computer system may encompass a computing device, and vice versa, where appropriate. Moreover, the reference to a computer system may encompass one or more computer systems, where appropriate.

This disclosure contemplates any suitable number of computer systems 1010. This disclosure contemplates computer system 1010, taking any suitable physical form. As an example and not by way of limitation, computer system 1010 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1010 may include one or more computer systems 1010; be unitary or distributed; span multiple locations; span multiple machines; span multiple data centers; or reside in a cloud, which may include one or more cloud components in one or more networks. Where appropriate, one or more computer systems 1010 may perform without substantial spatial or temporal limitation one or more steps of one or more methods described or illustrated herein. As an example and not by way of limitation, one or more computer systems 1010 may perform in real-time or in batch mode one or more steps of one or more methods described or illustrated herein. One or more computer systems 1010 may perform at different times or at different locations one or more steps of one or more methods described or illustrated herein, where appropriate.

In particular embodiments, computer system 1010 includes a processor 1020, memory 1030, storage 1040, an input/output (I/O) interface 1050, a communication interface 1060, and a bus 1070. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1020 includes hardware for executing instructions, such as those making up a computer program. As an example and not by way of limitation, to execute instructions, processor 1020 may retrieve (or fetch) the instructions from an internal register, an internal cache, memory 1030, or storage 1040; decode and execute them; and then write one or more results to an internal register, an internal cache, memory 1030, or storage 1040. In particular embodiments, processor 1020 may include one or more internal caches for data, instructions, or addresses. This disclosure contemplates processor 1020, including any suitable number of any suitable internal caches, where appropriate. As an example and not by way of limitation, processor 1020 may include one or more instruction caches, one or more data caches, and one or more translation lookaside buffers (TLBs). Instructions in the instruction caches may be copies of instructions in memory 1030 or storage 1040, and the instruction caches may speed up retrieval of those instructions by processor 1020. Data in the data caches may be copies of data in memory 1030 or storage 1040 for instructions executing at processor 1020 to operate on; the results of previous instructions executed at processor 1020 for access by subsequent instructions executing at processor 1020 or for writing to memory 1030 or storage 1040; or other suitable data. The data caches may speed up read or write operations by processor 1020. The TLBs may speed up the virtual-address translation for processor 1020. In particular embodiments, processor 1020 may include one or more internal registers for data, instructions, or addresses. This disclosure contemplates processor 1020, including any suitable number of any suitable internal registers, where appropriate. Where appropriate, processor 1020 may include one or more arithmetic logic units (ALUs); be a multi-core processor, or include one or more processors 1020. Although this disclosure describes and illustrates a particular processor, this disclosure contemplates any suitable processor.

In particular embodiments, memory 1030 includes main memory for storing instructions for processor 1020 to execute or data for processor 1020 to operate on. As an example and not by way of limitation, computer system 1010 may load instructions from storage 1040 or another source (for example, another computer system 1010) to memory 1030. Processor 1020 may then load the instructions from memory 1030 to an internal register or internal cache. To execute the instructions, processor 1020 may retrieve the instructions from the internal register or internal cache and decode them. During or after the execution of the instructions, processor 1020 may write one or more results (which may be intermediate or final results) to the internal register or internal cache. Processor 1020 may then write one or more of those results to memory 1030. In particular embodiments, processor 1020 executes only instructions in one or more internal registers or internal caches or in memory 1030 (as opposed to storage 1040 or elsewhere) and operates only on data in one or more internal registers or internal caches or in memory 1030 (as opposed to storage 1040 or elsewhere). One or more memory buses (which may each include an address bus and a data bus) may couple processor 1020 to memory 1030. Bus 1070 may include one or more memory buses, as described below. In particular embodiments, one or more memory management units (MMUs) reside between processor 1020 and memory 1030 and facilitate access to memory 1030 requested by processor 1020. In particular embodiments, memory 1030 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1030 may include one or more memories 1030, where appropriate. Although this disclosure describes and illustrates particular memory, this disclosure contemplates any suitable memory.

In particular embodiments, storage 1040 includes mass storage for data or instructions. As an example and not by way of limitation, storage 1040 may include a hard disk drive (HDD), a floppy disk drive, flash memory, an optical disc, a magneto-optical disc, magnetic tape, or a Universal Serial Bus (USB) drive or a combination of two or more of these. Storage 1040 may include removable or non-removable (or fixed) media, where appropriate. Storage 1040 may be internal or external to computer system 1010, where appropriate. In particular embodiments, storage 1040 is non-volatile, solid-state memory. In particular embodiments, storage 1040 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1040 taking any suitable physical form. Storage 1040 may include one or more storage control units facilitating communication between processor 1020 and storage 1040, where appropriate. Where appropriate, storage 1040 may include one or more storages 1040. Although this disclosure describes and illustrates particular storage, this disclosure contemplates any suitable storage.

In particular embodiments, I/O interface 1050 includes hardware, software, or both, providing one or more interfaces for communication between computer system 1010 and one or more I/O devices. Computer system 1010 may include one or more of these I/O devices, where appropriate. One or more of these I/O devices may enable communication between a person and computer system 1010. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1050 for them. Where appropriate, I/O interface 1050 may include one or more device or software drivers enabling processor 1020 to drive one or more of these I/O devices. I/O interface 1050 may include one or more I/O interfaces 1050, where appropriate. Although this disclosure describes and illustrates a particular I/O interface, this disclosure contemplates any suitable I/O interface.

In particular embodiments, communication interface 1060 includes hardware, software, or both providing one or more interfaces for communication (such as, for example, packet-based communication) between computer system 1010 and one or more other computer systems 1010 or one or more networks. As an example and not by way of limitation, communication interface 1060 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1060 for it. As an example and not by way of limitation, computer system 1010 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1010 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1010 may include any suitable communication interface 1060 for any of these networks, where appropriate. Communication interface 1060 may include one or more communication interfaces 1060, where appropriate. Although this disclosure describes and illustrates a particular communication interface, this disclosure contemplates any suitable communication interface.

In particular embodiments, bus 1070 includes hardware, software, or both coupling components of computer system 1010 to each other. As an example and not by way of limitation, bus 1070 may include an Accelerated Graphics Port (AGP) or other graphics bus, an Enhanced Industry Standard Architecture (EISA) bus, a front-side bus (FSB), an HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1070 may include one or more buses 1070, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    accessing an image of one or more target buildings captured by a device;
    detecting target building planes of the one or more target buildings in the image using a machine learning program;
    for each of the target building planes:
        generating a target embedding and target feature points for the target building plane;
        querying a three-dimensional (3D) map using the target embedding to identify at least one matching building plane for the target building plane;
        using the target feature points to identify matching feature points of the at least one matching building plane; and
        determining three-dimensional (3D) locations of the matching feature points using the 3D map, wherein the 3D locations of the matching feature points are identified using less than 900 feature points per building plane; and
    determining a pose of the device by comparing the target feature points of the target building planes and the 3D locations of the matching feature points associated with the target building planes.

2. The method of claim 1, further comprising
    generating feature points of buildings in a city based on images of the buildings; and
    generating the 3D map by comparing the feature points to a three-dimensional (3D) model of the city to associate the feature points to building elements of the buildings, wherein each building element comprises a building facet or a building plane.

3. The method of claim 1, wherein the determining a pose of the device comprises taking an inlier point and removing an outlier point using a customized random sample consensus algorithm (RANSAC).

4. The method of claim 3, wherein the RANSAC is configured to
    (a) randomly select a subset of the target building planes of the one or more target buildings in the image;
    (b) use the selected subset of the target building planes together to determine the 3D locations of the users; and
    (c) repeat (a) and (b) the process until identifying the 3D locations of the matching feature points and the outlier point.

5. The method of claim 1, wherein the features in the 3D map are generated from rectified images.

6. The method of claim 5, wherein the method further comprises rectifying at least a portion of the image.

7. The method of claim 6, wherein the image is rectified to a canonical orientation to decrease a viewpoint variance.

8. A system comprising:
    one or more processors; and
    one or more computer-readable non-transitory storage media coupled to one or more of the processors and comprising instructions operable when executed by one or more of the processors to cause the system to:
        access an image of one or more target buildings captured by a device;
        detect target building planes of the one or more target buildings in the image using a machine learning program;
        for each of the target building planes:
            generate a target embedding and target feature points for the target building plane;
            query a three-dimensional (3D) map using the target embedding to identify at least one matching building plane for the target building plane;
            use the target feature points to identify matching feature points of the at least one matching building plane; and
            determine three-dimensional (3D) locations of the matching feature points using the 3D map, wherein the 3D locations of the matching feature points are identified using less than 900 feature points per building plane; and
            determine a pose of the device by comparing the target feature points of the target building planes and the 3D locations of the matching feature points associated with the target building planes.

9. The system of claim 8, wherein the system is configured to
    generate feature points of buildings in a city based on images of the buildings; and
    generate the 3D map by comparing the feature points to a three-dimensional (3D) model of the city to associate the feature points to building elements of the buildings, wherein each building element comprises a building facet or a building plane.

10. The system of claim 8, wherein the determining a pose of the device comprises taking an inlier point and removing an outlier point using a customized random sample consensus algorithm (RANSAC).

11. The system of claim 10, wherein the RANSAC is configured to (a) randomly select a subset of the target building planes of the one or more target buildings in the image;
(b) use the selected subset of the target building planes together to determine the 3D locations of the users; and
(c) repeat (a) and (b) the process until identifying the 3D locations of the matching feature points and the outlier point.

12. The system of claim 8, wherein the features in the 3D map are generated from rectified images.

13. The system of claim 12, wherein at least a portion of the image is rectified.

14. The system of claim 13, wherein the image is rectified to a canonical orientation to decrease a viewpoint variance.

15. One or more computer-readable non-transitory storage media embodying software that is operable when executed to:
 access an image of one or more target buildings captured by a device;
 detect target building planes of the one or more target buildings in the image using a machine learning program;
 for each of the target building planes:
  generate a target embedding and target feature points for the target building plane;
  query a three-dimensional (3D) map using the target embedding to identify at least one matching building plane for the target building plane;
  use the target feature points to identify matching feature points of the at least one matching building plane; and
  determine three-dimensional (3D) locations of the matching feature points using the 3D map, wherein the 3D locations of the matching feature points are identified using less than 900 feature points per building plane; and
 determine a pose of the device by comparing the target feature points of the target building planes and the 3D locations of the matching feature points associated with the target building planes.

16. The media of claim 15, wherein the media is configured to
 generate feature points of buildings in a city based on images of the buildings; and
 generate the 3D map by comparing the feature points to a three-dimensional (3D) model of the city to associate the feature points to building elements of the buildings, wherein each building element comprises a building facet or a building plane.

17. The media of claim 15, wherein the media is configured to take an inlier point and remove an outlier point using a customized random sample consensus algorithm (RANSAC) for comparing the extracted building element of the target building to the feature points in the map, wherein the RANSAC is configured to
 (a) randomly select a subset of the target building planes of the one or more target buildings in the image;
 (b) use the selected subset of the target building planes together to determine the 3D locations of the users; and
 repeat (a) and (b) the process until identifying the 3D locations of the matching feature points and the outlier point.

18. The media of claim 15, wherein the features in the 3D map are generated from rectified images, wherein at least a portion of the image is rectified to a canonical orientation to decrease a viewpoint variance.

* * * * *